Aug. 18, 1953    P. H. TAYLOR    2,648,949
FLUID MOTOR

Filed June 24, 1952    2 Sheets-Sheet 1

INVENTOR.
Paul H. Taylor
BY
Attorney.

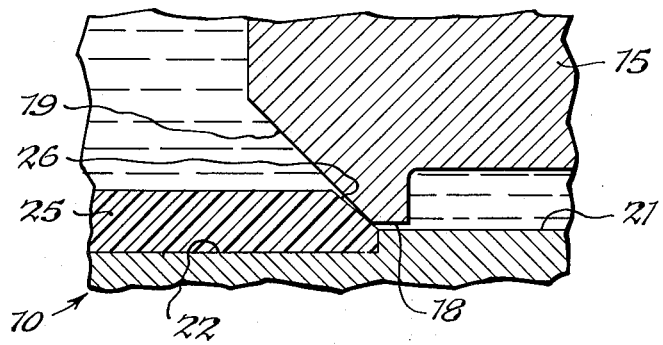
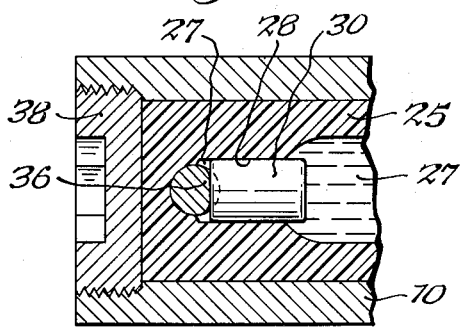
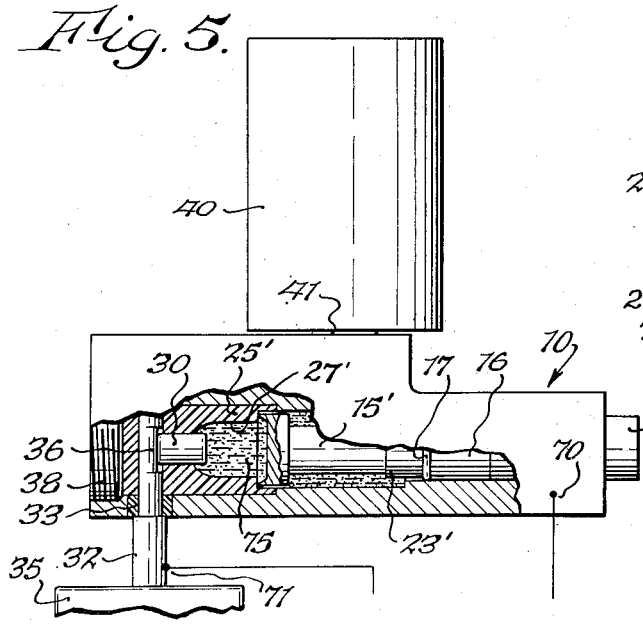
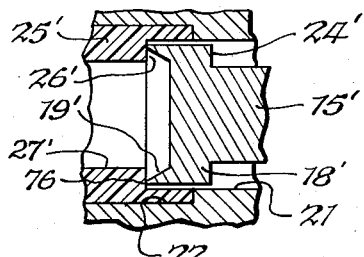

UNITED STATES PATENT OFFICE 2,648,949

FLUID MOTOR

Paul H. Taylor, Grand Island, N. Y., assignor to Wales-Strippit Corporation, North Tonawanda, N. Y., a corporation of New York Application June 24, 1952, Serial No. 295,300

18 Claims. (Cl. 60—1)

The present invention relates generally to expansible motors from which energy is releasable on demand, and more particularly to a motor of this type employing a compressible liquid that is compressed to store power and whose power is available for instantaneous release.

There are many types of motors designed to provide a contained force which is releasable on demand to perform some type of work. Spring motors are one type of such motor. In a spring motor, a mechanical spring, comprising steel wire or other resilient material, is loaded, and contained by a ratchet key or other stop means until such time as the energy is to be released to effect some work. In this same general category of expansible motors are included, also, apparatus of the type employing air as a compressible medium, and apparatus employing a liquid acting against a resilient air head. In both cases, when the power is released through suitable valving means, a piston is actuated to perform some type of work.

The apparatus of the present invention may be said to be more closely allied to apparatus of the second group. It may operate with air, or liquid and air. However, the present invention will be disclosed in connection with apparatus using a compressible liquid, such as any of the various mineral oils, and, in particular, silicone oils. The latter are preferable in that they have high compressibility characteristics providing forces which are extremely high for a small volume of liquid.

A primary object of the present invention is to provide apparatus whereby a contained force may be released instantly for the performance of work, which is simple and inexpensive in construction and foolproof in operation.

Another object of the invention is to provide a motor of this type employing a liquid in compression as the motivating force for the motor.

Another object of this invention is to provide a fluid motor in which the energy may be stored by actuation of the instrumentality that transmits the force of the motor.

Another object of the invention is to provide a fluid motor in which the energy-transmitting member has a valve connected to it that acts as the means for containing the force.

Another object of this invention is to provide a fluid motor in which the means for locking the energy-transmitting instrumentality in its cocked position is integral with the instrumentality itself.

A further objection of this invention is to provide a novel valving arrangement in which a small operator force may be utilized to instantly release the high forces of the motor.

Another object of this invention is to provide an integral manual apparatus for releasing the force of the motor.

Still another object of the invention is to provide a means for releasing the force by means of electricity.

Still another object of this invention is to provide a fluid motor which has a minimum of seals subject to leakage.

Other objects of the invention will be apparent hereinafter from the foregoing description and from the recital of the appended claims.

In the drawings:

Fig. 3 is an enlarged fragmentary section, showing one form of valve seat and valve that may be employed in a motor constructed according to this invention;

Fig. 4 is an enlarged section taken on the line 4—4 of Fig. 1;

Figure 1:
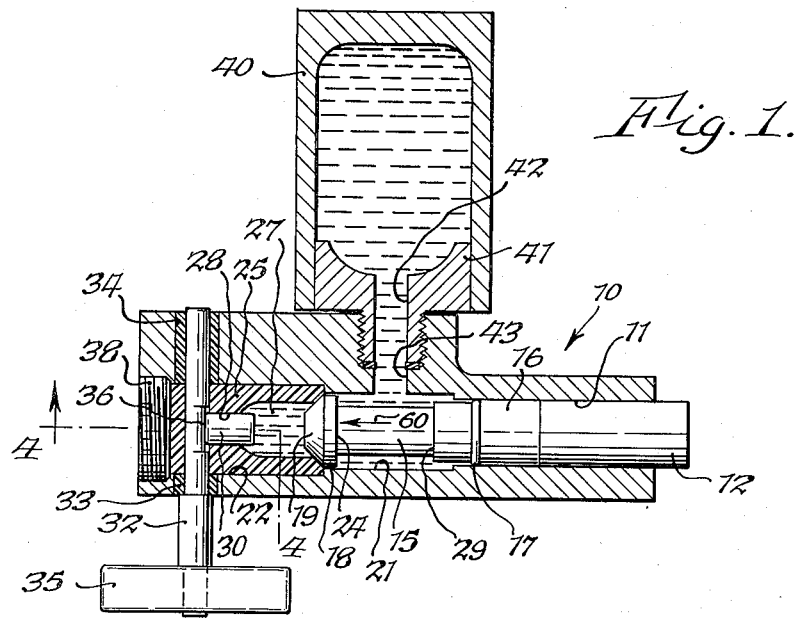
Fig. 1 is an axial section of a motor constructed according to one embodiment of this invention, and illustrating the components of the apparatus and showing the energy-transmitting member in its cocked, energy-contained position.

Fig. 5 is a side elevation with parts broken away and shown in section, illustrating a motor built according to a further embodiment of this invention and employing a modified form of valve and also using an electrical circuit in conjunction with a liquid of high resistivity whereby an electrical current passing through parts of the apparatus creates an expansion of the liquid by heat and resulting unbalance in the forces on the energy-transmitting member whereby the motor is actuated; and Fig. 6 is a fragmentary section on an enlarged scale illustrating the structure of the valve employed in the embodiment of Fig. 5.

Referring now to the drawings by numerals of reference and first of all to the embodiment of the invention shown in Figs. 1 to 4 inclusive the motor shown comprises a housing 10 which has a finished cylinder bore 11 in which there is mounted a reciprocable piston 12. Piston 12 is the force-producing and force-transmitting member of the motor. Piston 12 is of reduced diameter adjacent its inner end, as denoted at 13, and terminates at its inner end in a threaded shank 14 by which it is secured to a valve member 15. Seated on the reduced diameter portion 13 of piston 12 is a seal, that may be similar in construction to the seal disclosed in the copending patent application of Charles Lee Rovoldt, Serial No. 298,094, filed July 10, 1952, and comprising a cylindrical sleeve 16 made of nylon or the like, and an O-ring 17. The sleeve 16 is held between valve 15 and piston 12; and the O-ring 17 is interposed between the valve and the sleeve.

The valve member 15 is considerably reduced in diameter beyond the portion 23 thereof that is threaded on stud 14 of piston 12; and it terminates at its inner end in a poppet valve 18 which has a conical valve surface 19.

The bore 11 extends entirely through housing 10; but it is enlarged in diameter in its central portion as denoted at 21; and it is of still further enlarged diameter beyond its central portion and at the end opposite that in which the piston 12 reciprocates, as denoted at 22.

Mounted within the portion 22 of the bore is a cylinder member 25 which is formed at its inner end with a conical seat 26, to receive the conical valve surface 19.

The right hand face 24 of valve 18 is larger in diameter than the left hand face 29 of portion 23 of the valve member 15 and than seal 16. When the valve 18 is seated then on seat 26 the fluid pressure exerted on valve 18 holding it on its seat is greater than the fluid pressure exerted on face 29 and seal 16 tending to unseat the valve.

Cylinder member 25 is hollowed out to form a fluid chamber 27 and is formed with a cylindrical guide portion 28 that communicates with the bottom of fluid chamber 27 at the center of said bottom. A piston 30 is mounted to reciprocate in the cylindrical guide portion 28 of cylinder member 25.

Journaled in the housing 10 on bushings 33 and 34 is a shaft 32. This shaft has a handle 35 secured to it at one end by which it may be rotated; and it has a cam portion 36 formed on it between bushings 33 and 34, the periphery of which is eccentric of the axis of the shaft. The cam portion 36 engages the other end of piston 30 to actuate the same.

The cylinder member 25 is seated at its inner end against the shoulder formed in housing 10 at the juncture of the portions 22 and 21 of the bore 11. The member 25 is preferably made of a plastic material, such as nylon, and with the similarly-made bushings 33 and 34 insulates shaft 32 from the housing 10 electrically. A screw 38 is threaded into housing 10 against the outer end of the cylinder member 25 to provide a back-up support for this material and prevent its failure due to excessively high forces.

Mounted on the housing 10 is a tank or accumulator 40 that is closed at its outer end and that has a neck member 41 welded or otherwise secured in its other end. This neck member is threaded into housing 10 and is formed with a tubular bore 42 that communicates with a duct or chamber 43 which is formed in housing 10 at right angles to bore 11 and which communicates with the enlarged portion 21 of bore 11.

The surfaces 19 and 26 of the poppet valve 18 and of the seat therefor on member 25, respectively, have different cone angles; and these cone angles are so selected that when the valve is seated, the circle of contact of the valve with its seat is of greater diameter than the diameter of the seal 16 in bore 11. The purpose of this is to provide an unbalanced force as will be described later.

Tank or accumulator 40, duct 43, chamber 27 and bore 11 are filled with a compressed fluid such as a liquid silicone.

The operation of the device will now be described.

Figure 2:
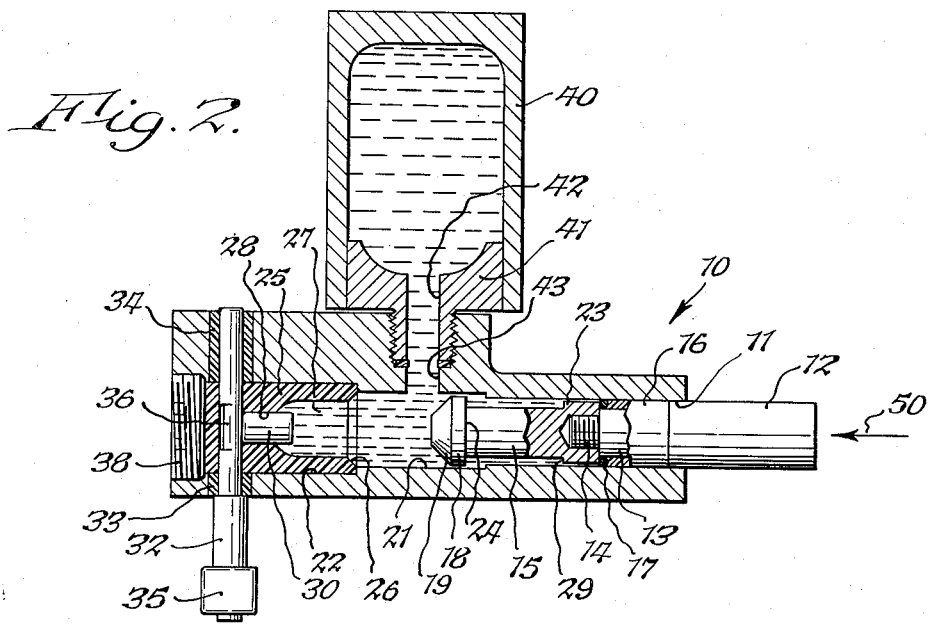
Fig. 2 is a section, similar to Fig. 1, but showing the motor after it has been released and the energy-transmitting member has completed its energy-transmitting stroke and delivered the force of the motor.

Referring now to Fig. 2, it will be noted that the force-providing device or piston 12 is in its extended position. In this position there is no force available from piston 12 since the force has all been dissipated. To charge the motor the piston must be restored to the position of Fig. 1. This is done by applying a force to piston 12 in the direction 50, causing the piston 12 to be forced toward the valve seat 26. This causes the liquid, which is confined between piston 12 and accumulator cylinder 40 to be gradually compressed within the chambers 27, 21 and 43 and accumulator 40. When the valve 18 seats on the valve seat 26 all the liquid in chamber 27, accumulator 40, passages 21 and 43 is compressed to the same degree, which pressure is the pressure at which the unit is cocked.

As soon as the valve 18 is seated on the seat 26, the handle 35 is turned so that the low point of the cam 36 of shaft 32 is brought into engagement with the back of the piston 30, allowing the piston 30 to move somewhat outwardly of cylinder member 25 under pressure of the liquid entrapped in chamber 27 by the closing of valve 18. Thereby the pressure of the liquid contained within the chamber 27 is reduced to zero. The result is that there is now in essence zero pressure in the chamber 27, whereas in the accumulator 40 and passages 43 and 21, the pressure is maintained at the charged high rate. Because the exposed area of the right hand face of valve 18 is greater than the exposed areas of face 29 of valve member 15 and of O-ring 17 and sleeve 16, the valve 18 will therefore be held seated by fluid pressure. There is, therefore, an unbalanced force, acting in the direction of the arrow 60 (Fig. 1) holding the valve 18 seated. This force is equal to the pressure of the liquid in chambers 21, 43 and 40 times the differential in areas between the seat area of valve 18 and the seal.

When it is desired to actuate the piston 12, it is merely necessary to turn the handle 35 slightly until the high part of cam 36 puts a slight pressure on the piston 30. Thereby the liquid in chamber 27 is pressurized, overcoming the slight unbalance of forces previously existing in the direction 60. This causes the valve 18 to be forced away from its seat 26. As the valve is cracked, the entire fluid pressure contained within the acmumulator 40 is caused to operate on the full area of the faces 19 and 29 and of seal 16 causing a rapid acceleration in movement of the piston 12 toward the right, and delivering through the pressure, which has been stored within the accumulator 40, a resultant force to effect work. This force is equal to the pressure times the sealed area of piston 12.

It is interesting to note here that the operation of the device does not require that pressure equal to that within the accumulator 40 be exerted in the chamber 27 in order to unseat valve 18, since the pressure required to unseat the valve need only be sufficient (pressure times the area involved) to overcome the unbalanced force 60 to cause the operation of the device. The force required for turning the handle 35 is but a very small fraction of the force which would be required to create a pressure in chamber 27 equal to that within accumulator 40. This pressure, of course, can be varied by varying the differential in area between the seal 16 and seating area of the poppet valve 18.

The pressure required to unseat the valve 18 can also be generated by means of an expansion of the liquid in the chamber 27, which in turn creates pressure. This can be accomplished by using an electrical conducting compressible liquid, or introducing into the silicone or other oil used in the device, a conducting electrical material such as graphite to provide a means for carrying an electrical current therethrough with some degree of resistance whereby heat will be generated.

Modified apparatus operating on this principle is shown in Figs. 5 and 6. The structure of the device may be generally the same as that previously described. Here, however, graphite particles are, as shown, incorporated in the liquid 75. Here, also, an electrical connection is made at 70 to housing 10 and at 71 to shaft 32. The latter connection carries the current to piston 30 since shaft 32 and piston 30 are insulated from the housing 10 by the nylon bushings 33 and 34 and cylinder member 25'. The current thus travels through liquid 75 between the piston 30 and the valve, here denoted 18'. When a switch (not shown) connecting lines 70 and 71 is closed, the current passing through liquid 75 creates heat which causes the expansion of the liquid within chamber 27' and generates pressure whereby valve 18' will be forced off its seat. Since the amount of fluid within the chamber 27' can be extremely small, a small amount of current can generate heat and resultant pressure almost instantly; and since the force required to create the unbalance is slight, actuation of piston 12 is instantaneous, as before.

It will be noted that in the embodiment of the invention shown in Figs. 5 and 6, a somewhat different type of valve is utilized, the valve 18' here employed being formed with a sharp edge, 76. The edge 76 seats against a plane seat 26' formed on a cylinder member 25' to provide a seal. This seating edge 76 is formed by dishing valve head 18' internally. This seating edge 76 is at a radial distance from the axis of valve member 15' greater than the radius of seal 16 so that, as before, when piston 30 is forced inwardly of chamber 27', a pressure can be built up on the inside face 19' of piston head 18' sufficient to overcome the differential between the pressure acting on the right hand face 24' of the valve head 18' to provide the area sealed by seating edge 76 and the pressure acting on the exposed areas of the left hand faces or area of collar portion 23' of valve member 15' and of the seal 16—17. As before, member 25' is preferably made of a resilient material such as nylon.

Obviously, other types of valves can also be utilized, so long as the effective areas of the poppet valve are greater than that of the seal 16 on piston 12 to provide the unbalance described and required to motivate the piston 12.

While the invention has been described, then, in connection with different embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A fluid motor comprising a body provided with a pair of communicating chambers which are adapted to be filled with a liquid, a member movable into said body to compress the liquid contained in said chambers, a valve connected to said member to move therewith to close off one of said chambers from the other chamber when said member is moved inwardly of said body, and means for pressurizing and depressurizing the liquid in said one chamber.

2. A fluid motor comprising a body provided with a chamber which is adapted to be filled with a liquid, a force-producing member reciprocable in said body and movable inwardly of said chamber to compress the liquid contained in said chamber, a valve connected to said member to move therewith, said body being provided with a seat on which said valve is seated by said member in its inward movement and on which said valve is held by the liquid pressure created when said member is moved inwardly of said chamber, and means for unseating said valve against said liquid pressure.

3. A fluid motor comprising a body provided with a chamber which is adapted to be filled with a liquid, a piston reciprocable in said body and movable inwardly of said chamber to compress the liquid contained therein, a valve rigidly connected to said piston at the inner end of said piston, said body being provided with a seat on which said valve is seated at the end of the inward movement of said piston and on which said valve is held by pressure of the liquid in said chamber, and means for unseating said valve and permitting the pressure of said liquid to be exerted on said piston to thrust said piston outwardly of said chamber.

4. A fluid motor comprising a body having a chamber therein, which is adapted to be filled with a liquid, a piston reciprocable in said body and movable inwardly of said chamber to compress the liquid contained therein, a valve rigidly connected to said piston at the inner end of said piston, said valve being smaller in diameter than said chamber, said body being provided with a seat on which said valve is seated at the end of the inward movement of said piston and on which said valve is held by pressure of the liquid in said chamber, and means for unseating said valve and permitting the pressure of said liquid to be exerted on said piston to thrust said piston outwardly of said chamber.

5. A fluid motor comprising a body having a chamber therein which is adapted to be filled with a liquid, a piston reciprocable in said body and movable inwardly of said chamber to compress the liquid contained therein, a valve rigidly connected to said piston at the inner end of said piston, said valve being smaller in diameter than said chamber, said body being provided with a seat on which said valve is seated at the end of the inward movement of said piston and on which said valve is held by pressure of the liquid in said chamber, the circle of contact of said valve with said seat being of greater diameter than the diameter of said piston at its inner end, and means for unseating said valve and permitting the pressure of said liquid to be exerted on said piston to thrust said piston outwardly of said chamber.

6. A fluid motor comprising a body having a chamber therein which is adapted to be filled with a liquid, a piston reciprocable in said body and movable inwardly of said chamber to compress the liquid contained therein, a valve having a stem portion rigidly connected to said piston at the inner end of said piston to move therewith, said valve being of greater diameter than its stem portion and having a conical seating surface, said body being provided with a conical seat on which said valve is seated by said piston in its inward movement, the cone angle of said seat being different from the cone angle of the seating surface of said valve to provide a circle of contact between said valve and its seat of greater diameter than the diameter of said piston at its inner end, and means for unseating said valve and permitting the pressure of the liquid in said chamber to be exerted on the inner end of said piston to thrust said piston outwardly of said chamber.

7. A fluid motor comprising a body having a bore, a piston reciprocable in said bore, a valve having a stem portion connected to said piston at the inner end of said piston, said bore being enlarged in its inner portion, to provide a chamber adapted to contain a liquid, said valve having a head of greater diameter than its stem portion, said body being provided with a seat on which said valve is seated on inward movement of said piston and on which said valve is held by pressure of the liquid in said bore, and means for unseating said valve and permitting the pressure of said liquid to be exerted on said piston to thrust said piston outwardly of said chamber.

8. A fluid motor comprising a body having a bore, a piston reciprocable in said bore, a valve having a stem portion connected to said piston at the inner end of said piston, said valve having a head of greater diameter than its stem portion, said body being provided with a chamber communicating with said bore, said chamber and bore being filled with a liquid, said body being provided with a seat on which said valve is seated on inward movement of said piston and on which said valve is held by the pressure of said liquid, the circle of contact of the valve with said seat being of greater diameter than said piston, and means for unseating said valve and permitting the pressure of said liquid to be exerted on said piston to thrust said piston outwardly of said chamber.

9. A fluid motor comprising a body provided with a pair of communicating chambers which are adapted to be filled with a liquid, a member movable into said body to compress the liquid contained in said chambers, a valve connected to said member to move therewith to close off one of said chambers from the other chamber when said member is moved inwardly of said body, and a member movably mounted in said body and movable in one direction to release the pressure in said one chamber and movable in the opposite direction to unseat said valve and permit the pressure of said liquid to force the first-named member outwardly of said body.

10. A fluid motor comprising a body provided with a pair of communicating chambers which are adapted to be filled with a liquid, a member movable into said body to compress the liquid contained in said chambers, a valve connected to said member to move therewith to close off one of said chambers from the other chamber when said member is moved inwardly of said body, and means for expanding the liquid entrapped in said one chamber to unseat said valve and permit the pressure of the liquid in the other chamber to force said member outwardly of said body.

11. A fluid motor comprising a body provided with a chamber adapted to be filled with a liquid, a piston reciprocable in said body and movable inwardly of said body to compress the liquid in said chamber, and a headed member rigidly connected to said piston and adapted to be positioned at the inner end of the piston movement so that the pressure of said liquid is exerted on said headed member to hold said piston in its inner position, and means for moving said headed member against said pressure to permit said pressure to be exerted on said piston to force said piston outwardly.

12. A fluid motor comprising a body provided with a pair of communicating chambers adapted to be filled with a liquid, a piston reciprocable in said body and adapted on inward movement thereof to compress the liquid in said chambers, a valve having a stem portion aligned axially with said piston and secured at one end to the inner end of said piston to move therewith and having an enlarged head at its opposite end, said valve being adapted at the end of the inward movement of said piston to seal off one of said chambers from the other and to be held seated in sealing position by the pressure on its head of the liquid in said other chamber, a second piston reciprocable in said one chamber, and means for releasing said second piston to release the pressure in said one chamber, and for forcing said second piston inwardly of said one chamber to force said valve open to permit the liquid pressure in said other chamber to force the first piston outwardly.

13. A fluid motor comprising a body provided with a pair of communicating chambers adapted to be filled with a liquid, a piston reciprocable in said body and adapted on inward movement thereof to compress the liquid in said chambers, a valve having a stem portion aligned axially with said piston and secured at one end to the inner end of said piston to move therewith and having an enlarged head at its opposite end, said valve being adapted at the end of the inward movement of said piston to seal off one of said chambers from the other and to be held seated in sealing position by the pressure on its head of the liquid in said other chamber, a second piston reciprocable in said one chamber, and a cam rotatable in said body and operatively engaging the second piston whereby upon rotation of said cam said second piston may be moved selectively outwardly of said one chamber to release the pressure therein or inwardly of said one chamber to force said valve open to permit the liquid pressure in said other chamber to force the first piston outwardly.

14. A fluid motor comprising a body provided with a pair of communicating chambers adapted to be filled with liquid, a piston reciprocable in said body and adapted on inward movement thereof to compress the liquid in said chambers, a valve having a stem portion aligned axially with said piston and secured at one end to the inner end of said piston to move therewith and having an enlarged head at its opposite end, said valve being adapted at the end of the inward movement of said piston to seal off one of said chambers from the other and to be held seated in sealing position by the pressure on its head of the liquid in said other chamber, and means for expanding the liquid in said one chamber to open said valve to permit the liquid pressure in said other chamber to force the first piston outwardly.

15. A fluid motor comprising a body provided with a pair of communicating chambers adapted to be filled with a liquid, a piston reciprocable in said body and adapted on inward movement thereof to compress the liquid in said chambers, a valve having a stem portion aligned axially with said piston and secured at one end to the inner end of said piston to move therewith and having an enlarged head at its opposite end, said body being provided with a seat against which the head of said valve is adapted to seat at the end of the inward movement of said piston to seal off one of said chambers from the other, whereby the pressure of the liquid in the other chamber on the head of said valve holds said valve seated and said piston in its inward position, said valve having a circle of contact with said seat whose diameter is greater than the diameter of said piston, and means for forcing said valve off its seat to permit the pressure of liquid in said other chamber to force said piston outwardly.

16. A fluid motor comprising a body provided with a bore, a piston reciprocable in said bore, a reservoir at one side of said bore but communicating with said bore in the inner portion of said bore, said body being provided also with a chamber which communicates with said bore and which is aligned axially therewith, said bore, chamber, and reservoir being adapted to be filled with a liquid which is compressed on inward movement of said piston in said bore, a valve axially aligned with said piston and having a stem portion secured at one end to the inner end of said piston and having an enlarged head at its other end, said chamber having a seat on which said valve seats at the end of the inward movement of said piston whereby to seal off the compressed liquid in said chamber from the compressed liquid in said bore and said reservoir so that the pressure of liquid in said bore and said reservoir holds said valve seated and said piston in its inward position, and means for opening said valve to permit the liquid pressure to force said piston outwardly.

17. A fluid motor comprising a body provided with a bore, a piston reciprocable in said bore, a reservoir at one side of said bore but communicating with said bore in the inner portion of said bore, said body being provided also with a chamber which communicates with said bore and which is aligned axially therewith, said bore, chamber, and reservoir being adapted to be filled with a liquid which is compressed on inward movement of said piston in said bore, a valve axially aligned with said piston and having a stem portion secured at one end to the inner end of said piston and having an enlarged head at its other end, said chamber having a seat on which said valve seats at the end of the inward movement of said piston whereby to seal off the compressed liquid in said chamber from the compressed liquid in said bore and said reservoir so that the pressure of liquid in said bore and said reservoir holds said valve seated and said piston in its inward position, and means for expanding the liquid entrapped in said chamber to force said valve open to permit the liquid pressure to force said piston outwardly.

18. A fluid motor comprising a body provided with a bore, a piston reciprocable in said bore, a reservoir at one side of said bore but communicating with said bore in the inner portion of said bore, said body being provided also with a chamber which communicates with said bore and which is aligned axially therewith, said bore, chamber, and reservoir being adapted to be filled with a liquid which is compressed on inward movement of said piston in said bore, a valve axially aligned with said piston and having a stem portion secured at one end to the inner end of said piston and having an enlarged head at its other end, said chamber having a seat on which said valve seats at the end of the inward movement of said piston whereby to seal off the compressed liquid in said chamber from the compressed liquid in said bore and said reservoir so that the pressure of liquid in said bore and said reservoir holds said valve seated and said piston in its inward position, a member movable outwardly and inwardly of said chamber for releasing the pressure in said chamber and building up said pressure to force said valve open, respectively, and cam means for operating said last-named member.

PAUL H. TAYLOR.

No references cited.